(12) United States Patent
Lee et al.

(10) Patent No.: US 8,964,896 B2
(45) Date of Patent: Feb. 24, 2015

(54) PLS HEADER CODING FOR EFFICIENT SIGNALING OF MODULATION AND CODING SCHEMES FOR BROADBAND SATELLITE COMMUNICATIONS SYSTEMS

(71) Applicant: Hughes Network Systems, LLC, Germantown, MD (US)

(72) Inventors: Lin-Nan Lee, Potomac, MD (US); Mustafa Eroz, Germantown, MD (US); Neal Becker, Frederick, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 13/896,275

(22) Filed: May 16, 2013

(65) Prior Publication Data

US 2014/0341118 A1 Nov. 20, 2014

(51) Int. Cl.
*H03C 3/00* (2006.01)
*H04L 12/741* (2013.01)
*H04W 72/04* (2009.01)

(52) U.S. Cl.
CPC ............... *H04L 45/74* (2013.01); *H04W 72/04* (2013.01)
USPC .......................................................... 375/302

(58) Field of Classification Search
USPC ......... 375/302, 316, 322, 340, 343, 346, 350; 370/465, 470, 474
See application file for complete search history.

(56) References Cited

U.S. PATENT DOCUMENTS

| | | | |
|---|---|---|---|
| 4,398,291 A | 8/1983 | Hotta et al. | |
| 5,581,688 A | 12/1996 | Jiang et al. | |
| 5,805,822 A | 9/1998 | Long et al. | |
| 6,522,665 B1 | 2/2003 | Suzuki et al. | |
| 7,706,315 B2 | 4/2010 | Vanderaar et al. | |
| 7,715,786 B2 | 5/2010 | Santoru et al. | |
| 8,208,499 B2 | 6/2012 | Sun et al. | |
| 8,605,843 B2* | 12/2013 | Dupont et al. | ................ 375/347 |
| 2004/0252725 A1 | 12/2004 | Sun et al. | |
| 2007/0206638 A1 | 9/2007 | Santoru et al. | |
| 2007/0208884 A1 | 9/2007 | Vanderaar et al. | |

(Continued)

FOREIGN PATENT DOCUMENTS

WO WO0010301 2/2000

OTHER PUBLICATIONS

EPO, "Extended European Search Report", EPO Application No. 14168480.3, Nov. 10, 2014.
Hughes Network Systems, "Evolutionary DVB-S2 Proposal", DVB, XP017840344, Feb. 17, 2013.

(Continued)

*Primary Examiner* — Khanh C Tran
(74) *Attorney, Agent, or Firm* — Potomac Technology Law, LLC

(57) ABSTRACT

An approach is provided for an improved coding approach for efficient header signaling in broadband communications networks, to provide support of expanded modulation and coding scheme sets that facilitate an expansion of the operational ranges of user terminals within such networks and finer granularity within such operational ranges. A mode indicator field of a frame header identifies a modulation/coding mode applied to a data payload of the data frame. The modulation/coding mode is one of either a first or second set of modulation/coding modes. The mode indicator field is encoded and modulated. When the modulation/coding mode is one of the first set, the modulation of the encoded mode indicator field is applied in a first mode, and when the modulation/coding mode is one of the second set, the modulation of the encoded mode indicator field is applied in a second mode.

24 Claims, 10 Drawing Sheets

(56) References Cited

U.S. PATENT DOCUMENTS

| | | |
|---|---|---|
| 2009/0034654 A1 | 2/2009 | Inukai et al. |
| 2009/0279475 A1 | 11/2009 | Vanderaar et al. |
| 2010/0157931 A1 | 6/2010 | Vanderaar et al. |
| 2013/0142288 A1* | 6/2013 | Dinan .......................... 375/340 |
| 2013/0142291 A1* | 6/2013 | Dinan .......................... 375/343 |

OTHER PUBLICATIONS

Motorola, "Transport Block Size and MCS Signaling for E-UTRA", 3Gpp TSG RAN1 #51, Nov. 5, 2007.

Panasonic, "Transport Format Signaling and Padding Overhead", 3GPP TSG-RAN WG1 Meeting #50b, Oct. 8, 2007.

* cited by examiner

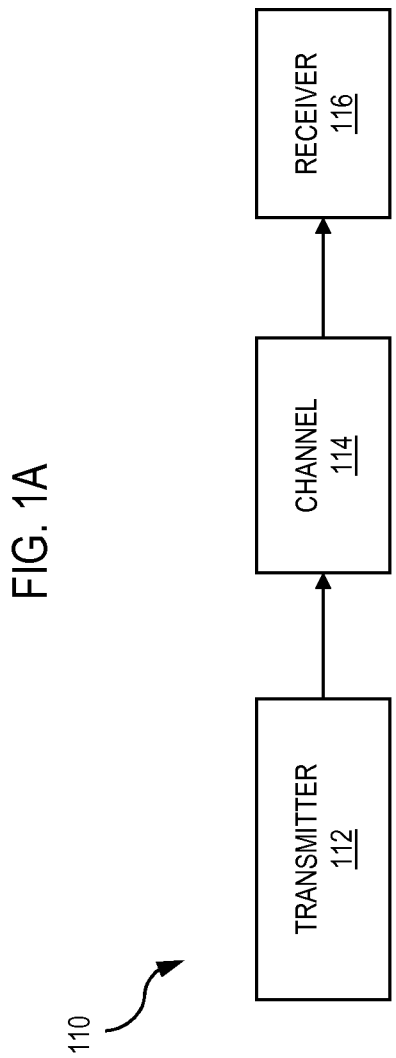

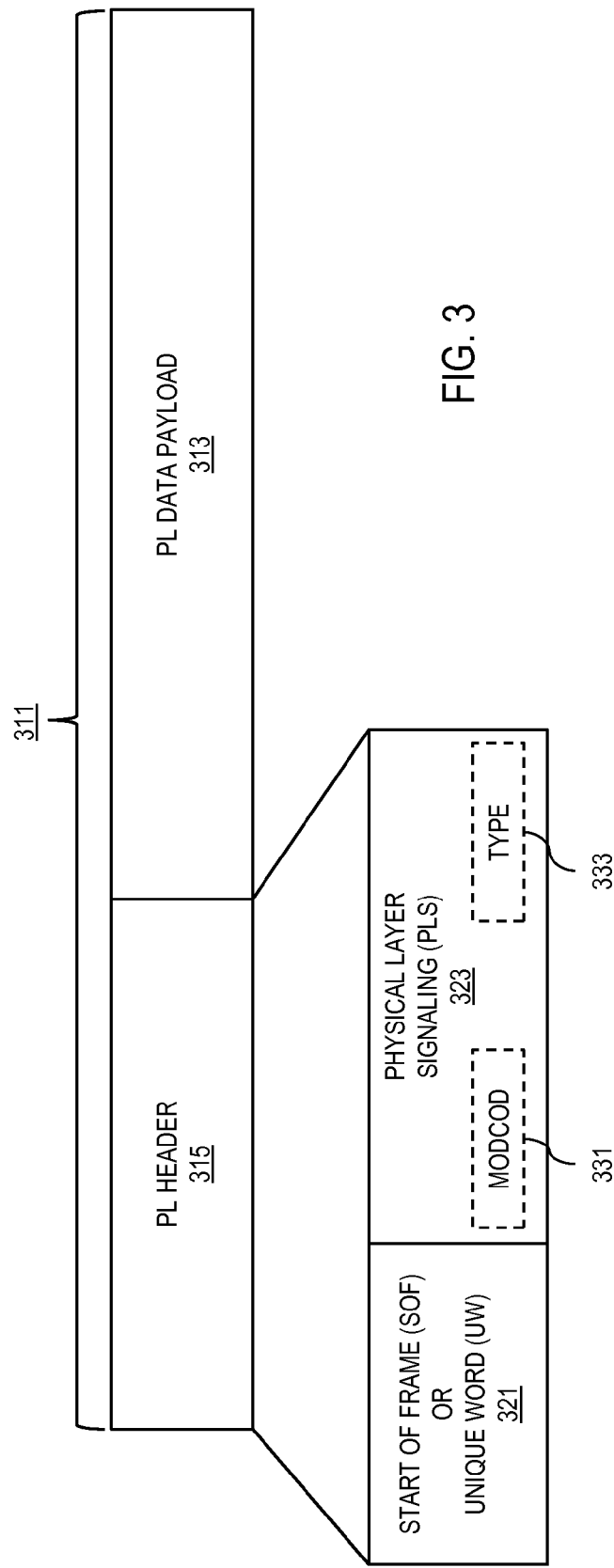

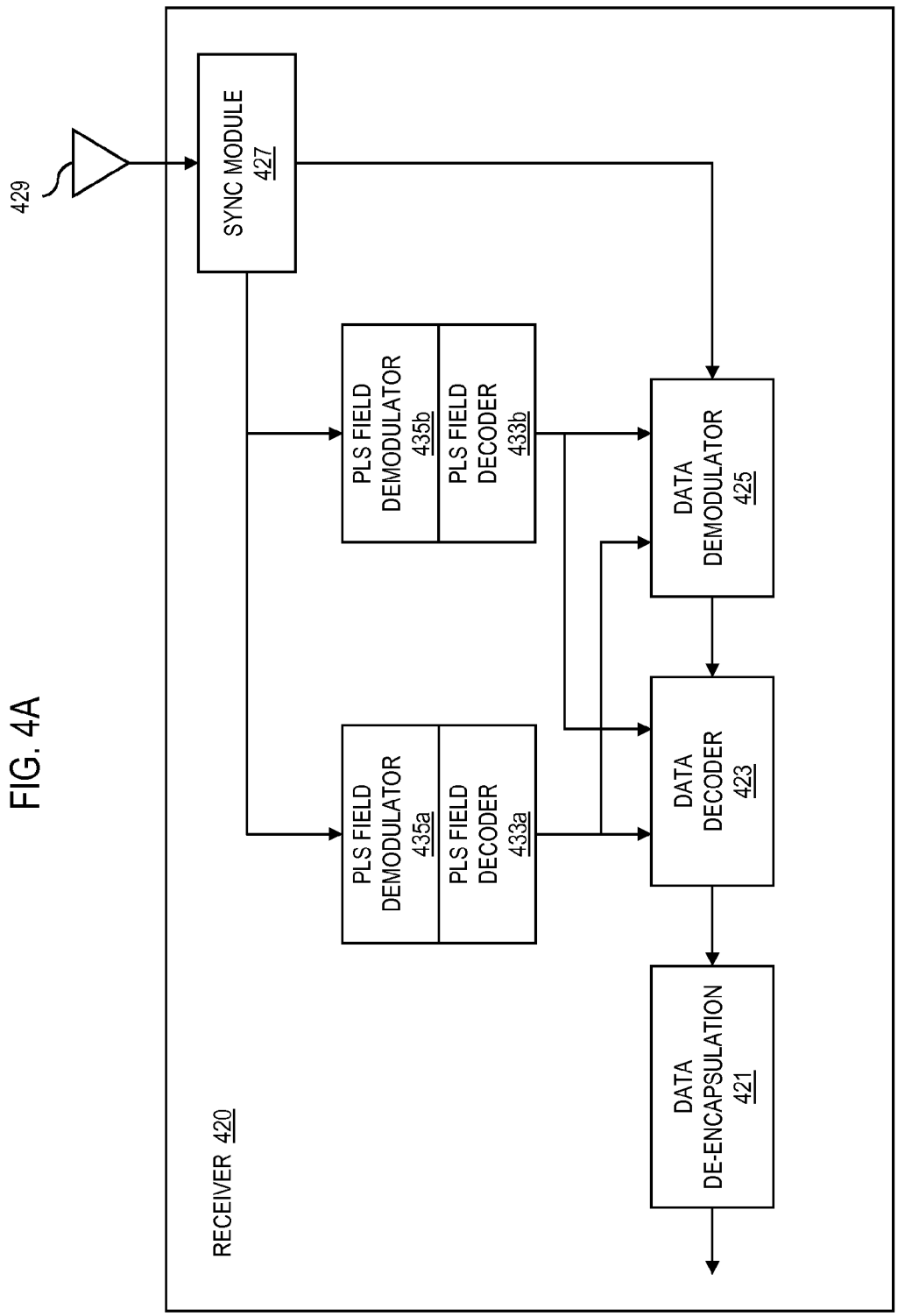

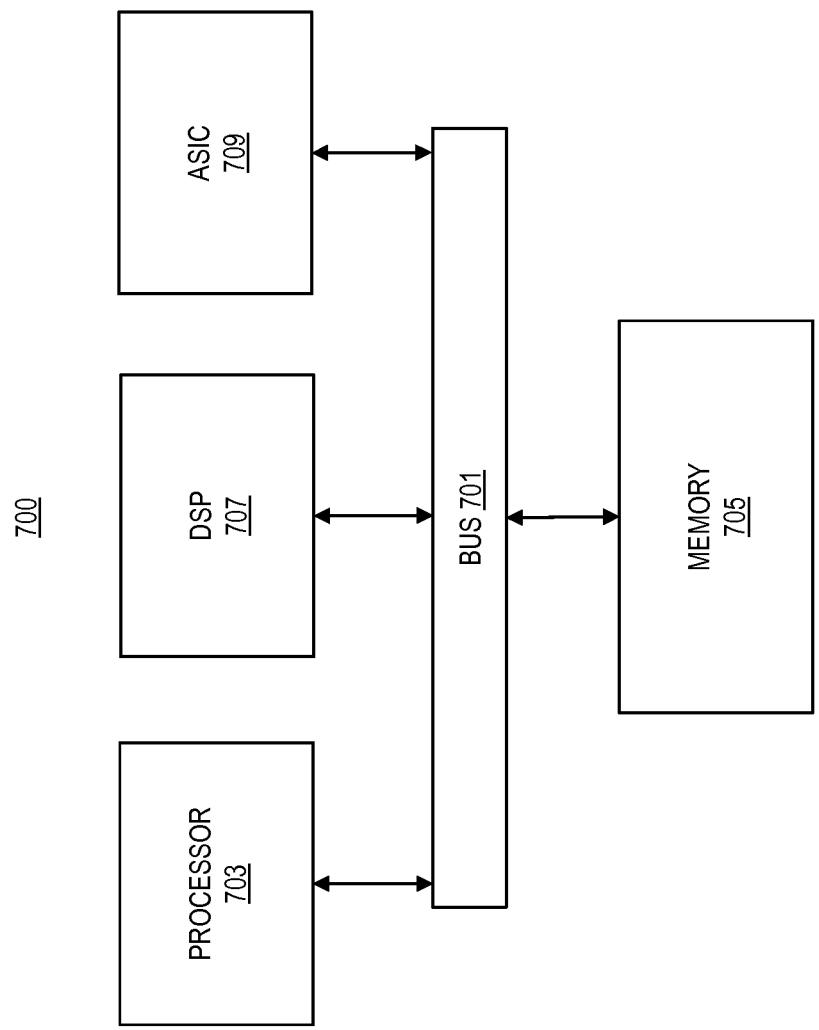

PLS HEADER CODING FOR EFFICIENT SIGNALING OF MODULATION AND CODING SCHEMES FOR BROADBAND SATELLITE COMMUNICATIONS SYSTEMS

BACKGROUND

Over recent decades, developments in data communications technologies have continued to provide enhanced multimedia services (e.g., voice, data, video, etc.) to end-users. Such communications technologies encompass various delivery platforms, including terrestrial wire-line, fiber and wireless communications and networking technologies, and satellite communications and networking technologies. Further, in recent years, the proliferation of mobile communications has spurred an exponential growth in the provision of such enhanced multimedia services over mobile communications networks (both terrestrial and satellite based). As part of the continued evolution of such communications platforms and supporting technologies, the Digital Video Broadcasting (DVB) organization was formed (as an industry-led, global consortium of broadcasters, manufacturers, network operators, software developers, regulatory bodies and others) to advance the design of open interoperable standards for the global delivery of digital media and broadcast services.

As part of the standardization process for digital media and broadcast services, the DVB organization managed the adoption and publication of the DVB-S2 standard via recognized standards setting organizations (e.g., ETSI and TIA). DVB-S2 is a digital satellite transmission system standard covering framing structure, channel coding and modulation systems, designed for broadcast services (for standard and high definition television), interactive services (e.g., Internet access for consumer applications), and other broadband satellite applications. DVB-S2 represents a flexible standard, covering a variety of data and multimedia services delivered over satellite communications systems. The DVB-S2 standard covers various technological features, such as a flexible input stream adapter (suitable for operation with single and multiple input streams of various formats), a robust forward error correction coding (FEC) system based on low-density parity check (LDPC) codes concatenated with Bose Chaudhuri Hocquenghem (BCH) codes, a wide range of code rates (from ¼ up to 9/10), four signal constellations (ranging in spectrum efficiency from 2 bit/s/Hz to 5 bit/s/Hz), and adaptive coding and modulation (ACM) functionality (optimizing channel coding and modulation on a frame-by-frame basis).

Since its inception, the DVB-S2 standard has been adopted globally as a predominant standard for broadcast, interactive and other broadband applications and services over satellite communications networks. Currently, there are applications and services for terminals, particularly in the field of mobile communications, that require operation at lower signal-to-noise ratios ($E_S/N_0$). The current modulation and coding schemes (e.g., the modulation and coding schemes of the DVB-S2 standard), however, are unable to support the operational requirements for such current mobile and other low signal-to-noise ratio (SNR) terminals (e.g., below −3 dB). Further, such current modulation and coding schemes are unable to support the operational requirements for higher end terminals (e.g., above 15.5 dB). Additionally, the modulation and coding schemes of the current DVB-S2 standard lack sufficient granularity to meet the requirements of terminals in the growing field of broadcast, interactive and other broadband applications and services over satellite communications networks.

Further, in order for systems to provide for expanded sets of modulation and coding schemes, the associated signaling provided to the receiver for proper decoding (e.g., the physical layer header signaling) must similarly be expanded to support identification of the expanded modulation and coding. One method for expanding the physical layer header signaling to support expanded modulation and coding scheme sets would simply be to increase the header size to directly support the expanded header signaling. Bandwidth resources and system efficiencies, however, are already being pushed to the limits in support of new wideband systems and higher data rate applications. The addition of additional signaling bits in the physical layer headers would thus create the undesirable effect of utilizing already scarce bandwidth for additional signaling overhead. An alternative method has been proposed in technical literature, whereby two different scramblers could be employed to provide the signaling of an additional bit. Essentially, one scrambler would be used to signify an additional bit (e.g., the most significant bit) as being zero (0), and the other scrambler would be used to signify the bit as being one (1). This approach, however, suffers from disadvantages associated with cross-correlation of the two scramblers, which could never be zero, and thus, there will be more degradation from the original Reed-Muller code in performance.

What is needed, therefore, is an improved coding approach for providing efficient header signaling in broadband satellite communications networks, to provide support of expanded modulation and coding scheme sets that facilitate an expansion of the operational ranges of user terminals within such networks and finer granularity within such operational ranges.

Some Example Embodiments

The present invention advantageously addresses the foregoing requirements and needs, as well as others, by providing a system and methods for an improved coding approach, providing efficient header signaling in broadband satellite communications networks in support of expanded modulation and coding schemes that facilitate an expansion of the operational ranges of user terminals within such networks and finer granularity within such operational ranges.

According to an example embodiment, a method comprises generating a mode indicator field for identifying a modulation and coding mode applied to a data payload of a data frame of a communications network, wherein the modulation and coding mode is one of either a first set of modulation and coding modes or a second set of modulation and coding modes, and encoding the mode indicator field. The method further comprises modulating the encoded mode indicator field, wherein: (1) when the modulation and coding mode is one of the first set of modulation and coding modes, the modulation is applied in a first mode; and (2) when the modulation and coding mode is one of the second set of modulation and coding modes, the modulation is applied in a second mode. Further, the first mode for the modulation of the encoded mode indicator field may comprise modulation in a first phase, and the second mode for the modulation of the encoded mode indicator field may comprise modulation in a second phase. By way of example, the first phase for the modulation of the encoded mode indicator field may be out of phase by approximately 90 degrees with respect to the second phase for the modulation of the encoded mode indicator field.

Moreover, according to a further example, the mode indicator field comprises a plurality of bits reflecting respective binary values, and each binary value is associated with a respective modulation and coding mode of the first set of modulation and coding modes and with a respective modulation and coding mode of the second set of modulation and coding modes. For a given mode indicator binary value, the modulation of the encoded mode indicator field distinguishes between the associated modulation and coding mode of the first set and the associated modulation and coding mode of the second set. Further, for the given mode indicator value, the modulation of the encoded mode indicator field in the first mode signifies the associated modulation and coding mode of the first set of modulation and coding modes, and the modulation of the encoded mode indicator field in the second mode signifies the associated modulation and coding mode of the second set of modulation and coding modes.

According to a further example embodiment, a method comprises receiving a signal stream transmitted over a communications channel, wherein the signal stream comprises one or more data frames, and each data frame comprises a frame header and a frame data payload. A start of frame (SOF) field is then detected within the signal stream, and a frame header of a one of the data frames is located based on the detected SOF field. The method further comprises demodulating and decoding a frame signaling field of the frame header, determining a mode of modulation applied to the frame signaling field, and determining a mode indicator field of the frame signaling field. Based on both the determined mode of modulation applied to the frame signaling field and the determined mode indicator field, a modulation and coding mode applied to the frame data payload is determined. Further, the mode of modulation applied to the frame signaling field may comprise one of a modulation in a first phase and a modulation in a second phase. By way of example, the first phase for the modulation of the frame signaling field is out of phase by approximately 90 degrees with respect to the second phase for the modulation of the frame signaling field.

Moreover, according to a further example, the mode indicator field comprises a plurality of bits reflecting respective binary values, and each binary value is associated with a respective modulation and coding mode of a first set of modulation and coding modes and with a respective modulation and coding mode of a second set of modulation and coding modes. For a given mode indicator value, the mode of modulation applied to the frame signaling field distinguishes between the associated modulation and coding mode of the first set and the associated modulation and coding mode of the second set. Further, for the given mode indicator value, a determination that the mode of modulation applied to the frame signaling field is of a first mode signifies the associated modulation and coding mode of the first set of modulation and coding modes, and a determination that the mode of modulation applied to the frame signaling field is of a second mode signifies the associated modulation and coding mode of the second set of modulation and coding modes.

According to yet a further example embodiment, an apparatus comprises at least one processor, and at least one memory including computer program code for one or more programs. The at least one memory and the computer program code configured to, with the at least one processor, cause the apparatus to perform at least the following functions. A mode indicator field, for identifying a modulation and coding mode applied to a data payload of a data frame of a communications network, is generated, wherein the modulation and coding mode is one of either a first set of modulation and coding modes or a second set of modulation and coding modes, and the mode indicator field is encoded. The encoded mode indicator field is modulated, wherein: (1) when the modulation and coding mode is one of the first set of modulation and coding modes, the modulation of the encoded mode indicator field is applied in a first mode; and (2) when the modulation and coding mode is one of the second set of modulation and coding modes, the modulation of the encoded mode indicator field is applied in a second mode. Further, the first mode for the modulation of the encoded mode indicator field may comprise modulation in a first phase, and the second mode for the modulation of the encoded mode indicator field may comprise modulation in a second phase. By way of example, the first phase for the modulation of the encoded mode indicator field is out of phase by approximately 90 degrees with respect to the second phase for the modulation of the encoded mode indicator field.

According to yet a further example embodiment, an apparatus comprises at least one processor, and at least one memory including computer program code for one or more programs. The at least one memory and the computer program code configured to, with the at least one processor, cause the apparatus to perform at least the following functions. A signal stream transmitted over a communications channel is received, wherein the signal stream comprises one or more data frames, and each data frame comprises a frame header and a frame data payload. A start of frame (SOF) field within the signal stream is detected. A frame header of a one of the data frames is located based on the detected SOF field, and a frame signaling field of the frame header is demodulated and decoded. A mode of modulation applied to the frame signaling field is determined, and a mode indicator field of the frame signaling field is determined. Based on both the determined mode of modulation applied to the frame signaling field and the determined mode indicator field, a modulation and coding mode applied to the frame data payload is determined. Further, the mode of modulation applied to the frame signaling field may comprise one of a modulation in a first phase and a modulation in a second phase. By way of example, the first phase for the modulation of the frame signaling field is out of phase by approximately 90 degrees with respect to the second phase for the modulation of the frame signaling field.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates a communications system capable of employing modulation and coding protocols, in accordance with example embodiments of the present invention;

FIG. 3 illustrates the frame format of a physical layer frame in accordance with the DVB-S2 framing structure, channel coding and modulation systems standard;

FIGS. 4A and 4B illustrate a block diagrams of example receivers configured to operate in the systems of FIGS. 1A and 1B, in accordance with example embodiments of the present invention;

FIG. 7 illustrates a block diagram of a chip set that can be utilized in implementing communications system protocols, according to example embodiments of the present invention.

DETAILED DESCRIPTION

Figure 1B:
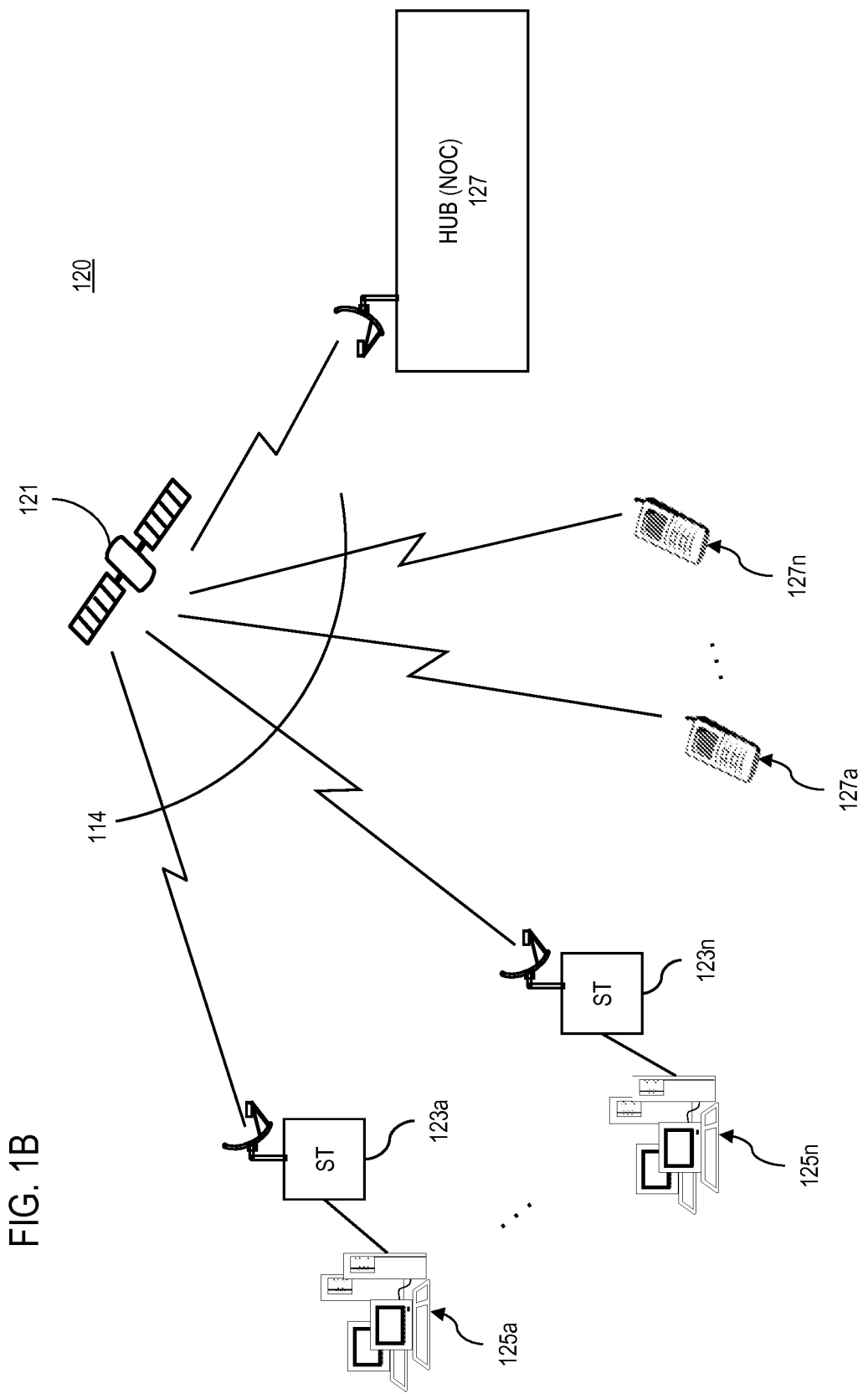
FIG. 1B illustrates a satellite communications system capable of employing modulation and coding protocols, in accordance with example embodiments of the present invention.

A system and methods for an improved coding approach, providing efficient header signaling in broadband satellite communications networks in support of expanded modulation and coding schemes that facilitate an expansion of the operational ranges of user terminals within such networks and finer granularity within such operational ranges, is described. In the following description, for the purposes of explanation, numerous specific details are set forth in order to provide a thorough understanding of the invention. It is apparent, however, that the invention may be practiced without these specific details or with an equivalent arrangement. In other instances, well known structures and devices are shown in block diagram form in order to avoid unnecessarily obscuring the invention.

FIG. 1A illustrates a communications system capable of employing modulation and coding protocols, in accordance with example embodiments of the present invention. With reference to FIG. 1A, a broadband communications system 110 includes one or more transmitters 112 (of which one is shown) that generate signal waveforms for transmission to one or more receivers 116 (of which one is shown). The signal waveforms are transmitted across a communications channel 114, which (for example) may comprise a channel of a terrestrial, wireless terrestrial or satellite communications system. In this discrete communications system 110, the transmitter 112 has a signal source that produces a discrete set of data signals, where each of the data signals is transmitted over a corresponding signal waveform. The discrete set of data signals may first be encoded (e.g., via a forward error correction (FEC) code) to combat noise and other issues associated with the channel 114. Once encoded, the encoded signals may then be modulated onto a carrier for transmission over the channel 114. The signal waveforms are attenuated, or otherwise altered, by communications channel 114.

FEC is required in terrestrial and satellite systems to provide high quality communication over a radio frequency (RF) propagation channel, which induces signal waveform and spectrum distortions, including signal attenuation (freespace propagation loss), multi-path induced fading and adjacent channel interference. These impairments drive the design of the radio transmission and receiver equipment; example design objectives include selecting modulation formats, error control schemes, demodulation and decoding techniques and hardware components that together provide an efficient balance between system performance and implementation complexity. Differences in propagation channel characteristics, such as between terrestrial and satellite communication channels, naturally result in significantly different system designs. Likewise, existing communications systems continue to evolve in order to satisfy increased system requirements for new higher rate or higher fidelity communication services.

FIG. 1B illustrates a satellite communications system capable of employing modulation and coding protocols, in accordance with example embodiments of the present invention. With reference to FIG. 1B, satellite communications system 120 includes a satellite 121 that supports communication among multiple satellite terminals (STs) 123a-123n, user terminals (UTs) 127a-127n, and a hub 127. The HUB 127 may assume the role of a Network Operations Center (NOC), which controls the access of the STs 123a-123n and UTs 127a-127n to the system 120, and also provides element management functions and control of the address resolution and resource management functionality. The Satellite communications system 120 may operate as a traditional bent-pipe system, where the satellite essentially operates as a repeater. Alternatively, the system 120 may employ a switching or processing satellite supporting mesh communications (point-to-point communications directly between a pair of the STs 123a-123n and UTs 127a-127n).

In a traditional bent-pipe system of an example embodiment, for example, the satellite operates as a repeater or bent pipe, and communications between the STs 123a-123n and UTs 127a-127n are transmitted over a double-hop path. For example, in a communication from ST 123a to ST 123n, over the first hop, the communication is transmitted, via the satellite, from the ST 123a to the HUB 127. The HUB 127 decodes the communication and determines the destination as ST 123n. The HUB 127 then appropriately addresses and repackages the communication, encodes and modulates it, and transmits the communication over the second hop, via the satellite, to the destination ST 123n. Accordingly, the satellite of such a system acts as a bent pipe or repeater, transmitting communications between the HUB 127 and the STs/UTs.

In an alternate embodiment, with a communications system 120 that employs a processing satellite (e.g., including a packet switch operating, for example, at a data link layer), the system may support direct unicast (point-to-point) communications and multicast communications among the STs 123a-123n and UTs 127a-127n. In the case of a processing satellite, the satellite 121 decodes the received signal and determines the destination ST(s)/UT(s) (as the hub 127 would in a bent-pipe system). The satellite 121 then addresses the data accordingly, encodes and modulates it, and transmits the modulated signal, over the channel 114, to the destination ST(s)/UT(s). Further, the STs 123a-123n may each provide connectivity to one or more respective hosts (e.g., hosts 125a-125n, respectively).

Further, based on recent trends in the advancement of current applications and services and in the development of new applications and services, it is envisioned that systems employing a multiplexing of data signals on the same channel 114 (e.g., time multiplexed), where (on a frame-by-frame basis) such data signals may be destined for different receive terminals of different capabilities (e.g., any combination of STs 125a-125n and UTs 127a-127n. For example, data signals destined for high S/N terminals (e.g., any of the STs 125a-125n) may be multiplexed with data signals destined for lower S/N terminals (e.g., any of the UTs 127a-127n), on the same channel 114 (on a frame-by-frame basis).

Figure 2A:
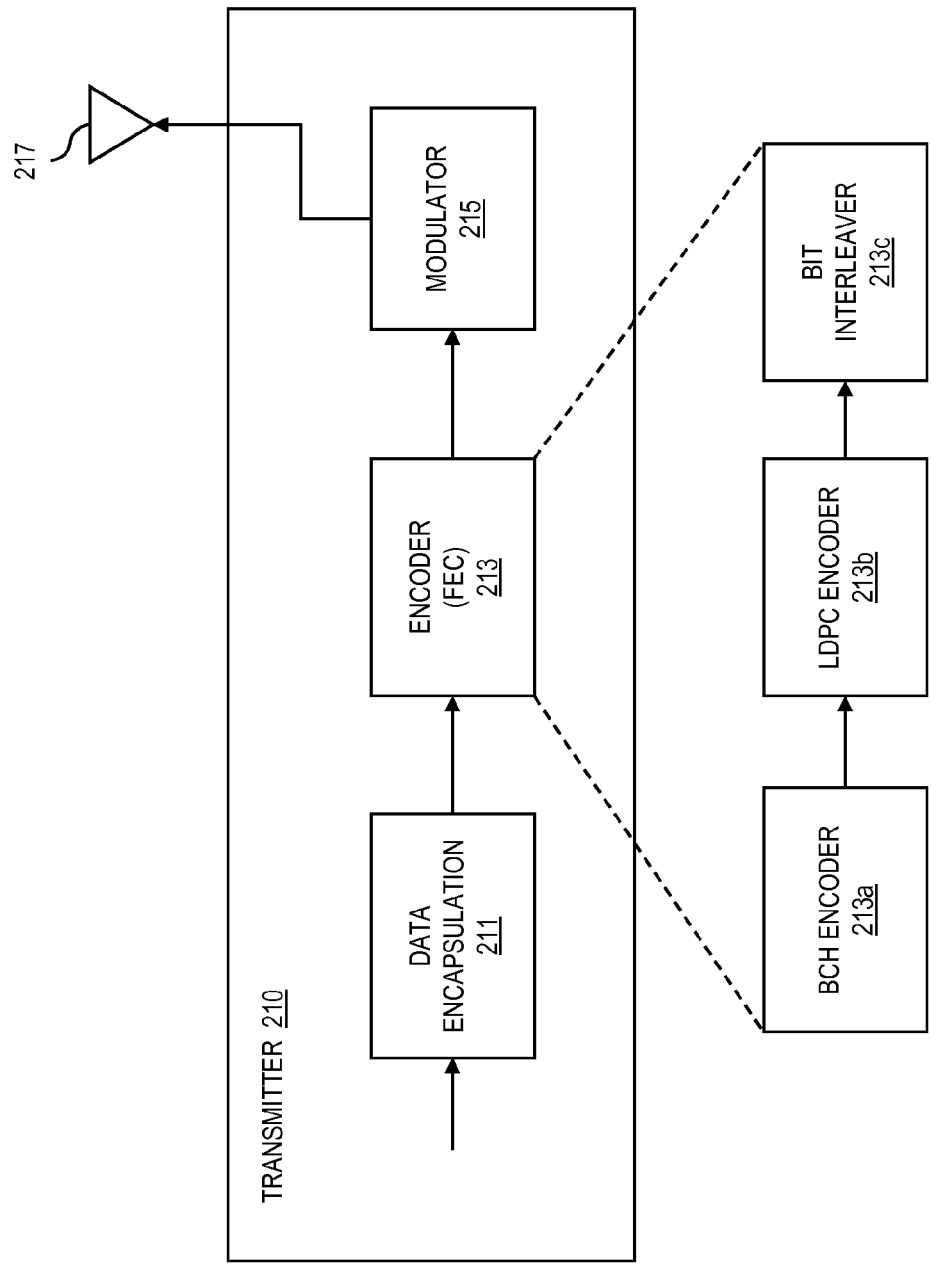
FIG. 2A illustrates a block diagram of an example transmitter configured to operate in the systems of FIGS. 1A and 1B.

FIG. 2A illustrates a block diagram of an example transmitter configured to operate in the systems of FIGS. 1A and 1B, in accordance with example embodiments of the present invention. With reference to FIG. 2A, the transmitter 210 is equipped with a data encapsulation module 211 that accepts the original application layer source data and performs the upper layer encapsulation to from the baseband frames. The encoder (e.g., an FEC encoder) 213 receives the baseband frames from the data encapsulation module 211, and outputs a coded stream of higher redundancy suitable for error correction processing at the receiver (shown in FIG. 6). The encoded signal is fed to the modulator 215, which maps the encoded messages to signal waveforms, based in part on modulation signal constellations. For example, the data encapsulation module 211 performs the upper layer encapsulation to generate the baseband frames based on the source data bits, and then the encoder 213 and modulator 215 collectively perform the modulation and coding of the baseband frames and the generation of the physical layer frames, in accordance with the example embodiments of the present invention. The physical layer frames are then transmitted (as signal waveforms), via the transmit antenna 217, over the communication channel 114 to the satellite 121.

Figure 2B:
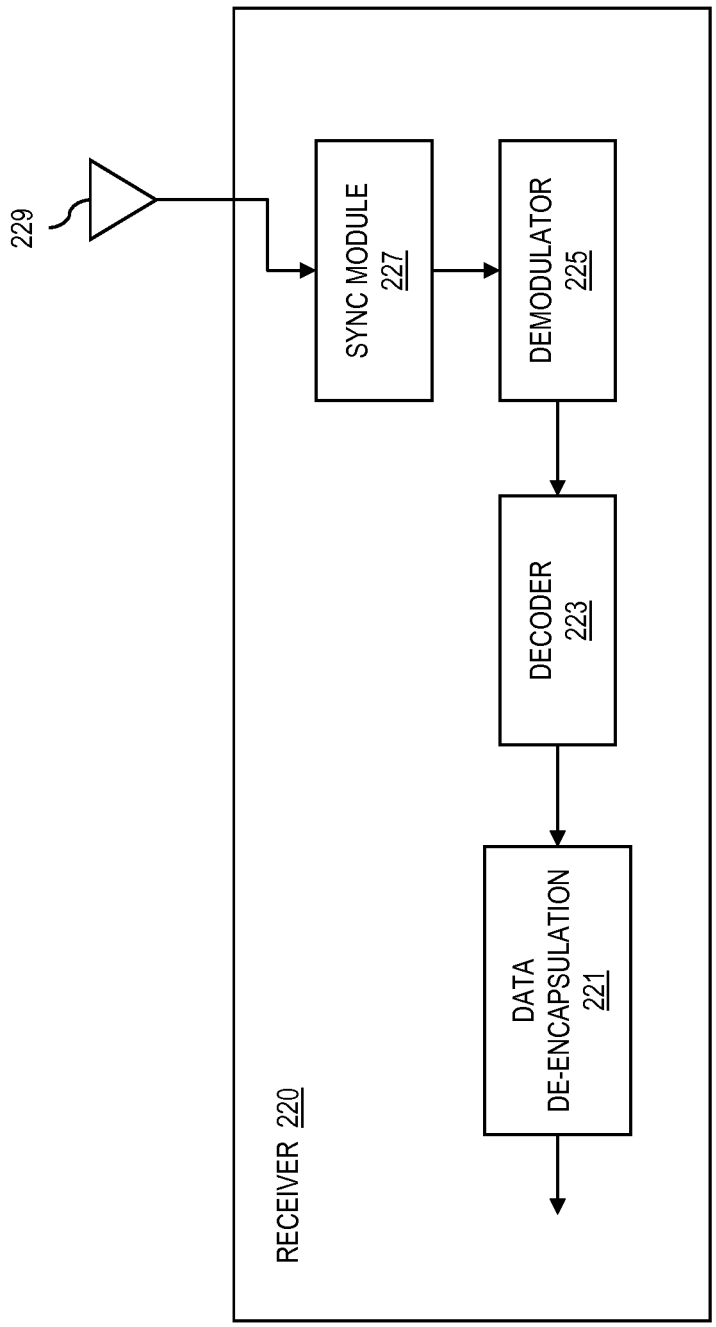
FIG. 2B illustrates a block diagram of an example receiver configured to operate in the systems of FIGS. 1A and 1B.

FIG. 2B illustrates a block diagram of an example receiver configured to operate in the systems of FIGS. 1A and 1B, in accordance with example embodiments of the present invention. With reference to FIG. 2B, the receiver 220 comprises receive antenna 229, sync module 227 demodulator 225, decoder 223 and de-encapsulation module 221. The receive antenna 229 receives the signal waveform transmitted over the channel 114 from the satellite 121. The sync module 227 detects the unique word, performs synchronization and determines the modcod and other PLS signaling of the PL Header. The demodulator 225 demodulates the received signal waveforms, based in part on the signal constellation employed for the modulation, to obtain the encoded signals. The decoder 223 then decodes the demodulated bit sequence to generate the encapsulated message data, and the de-encapsulation module 221 de-encapsulates the message data to regenerate the original source data.

As mentioned above, as one example embodiment for broadcast and broadband communications services over satellite networks, the DVB-S2 standard has been adopted globally as a predominant standard for broadcast, interactive and other broadband services and applications. The framing structure, channel coding and modulation systems of the DVB-S2 standard are described in the European Telecommunications Standards Institute (ETSI) publication, ETSI EN 302 307 V1.3.1, which is incorporated herein by reference in its entirety. DVB-S2 represents a flexible standard, covering a variety of data and multimedia services delivered over satellite communications systems. Generic Stream Encapsulation (GSE) protocols may be employed to provide a data link layer protocol that facilitates the transmission of user or application data from packet oriented protocols (e.g., Internet protocol or IP) on top of a unidirectional physical layer protocol (e.g., DVB-S2). According to the GSE protocol, application data in the form of packet data units (PDUs) are first encapsulated within the baseband frames of the communications network (e.g., DVB-S2 baseband packets in a satellite communications system).

The DVB-S2 standard, for example, was designed to facilitate robust synchronization and signaling at the physical layer, and synchronization and detection of the modulation and coding parameters by a receiver before demodulation and FEC decoding. At the physical layer, baseband frames are first encoded to form an output stream of FEC frames. For example, the baseband frames are encoded by the FEC encoder 213, which comprises a t-error BCH outer coding via the BCH encoder 213a, an LDPC inner coding via the LDPC encoder 213b, and bit interleaving via the bit interleaver 213c. The interleaver 213c reorders the encoded sequence of symbols or bits from the LDPC encoder 213b in a predetermined manner. Each FEC frame is then modulated based on one of various options specified in the standard for modulation of the data payload (e.g., QPSK, 8PSK, 16APSK, or 32APSK). For example, each FEC frame is serial-to-parallel converted, and each resulting parallel sequence is mapped based on a signal constellation, generating an (I, Q) sequence of variable length depending on the selected modulation efficiency ($\eta_{MOD}$ bits/Hz). The resulting output sequence is referred to as a complex FEC frame or XFEC frame, composed of $64{,}800/\eta_{MOD}$ (normal XFEC frame) modulation symbols for a normal XFEC frame, or $16{,}200/\eta_{MOD}$ (short XFEC frame) modulation symbols for a short XFEC frame. Physical Layer framing is then performed, by slicing the XFEC frames into a number of fixed length slots (of length M=90 symbols each), to generate the physical layer frames, as specified in Section 5.5 of the above-incorporated DVB-S2 publication, ETSI EN 302 307.

FIG. 3 illustrates the frame format of a physical layer frame in accordance with the prior art DVB-S2 framing structure, channel coding and modulation systems standard. With reference to FIG. 3, at a high level, the DVB-S2 physical layer framing comprises the structuring of the baseband frames (resulting from the upper layer encapsulation of user or application data) as a regular sequence of periodic physical layer frames (PL Frames) 311. Every PL Frame is composed of a physical layer data payload (PL Payload) 313 and a physical layer header (PL Header) 215. The payload comprises the modulation symbols resulting from the encoding and modulation of the source data bits, generated by encoding and modulating the source data bits according to the selected modulation and coding scheme, as described above. The PL Payload 313 corresponds to a code block of a concatenated LDPC/BCH FEC. The PL Header 315, which is intended for receiver synchronization and physical layer signaling, contains synchronization and signaling information (e.g., Start of Frame or UW field, type of modulation and FEC rate, frame length, presence/absence of pilot symbols). The PL Header, for example, comprises one slot of 90 symbols, and the PL Payload comprises an integer multiple of 90 symbols (excluding pilot symbols). The PL Header, is modulated based on a π/2 binary phase shift keying (BPSK) to generate the 90 modulation symbols, as follows:

$$I_{\cdot 2i-1}=Q_{\cdot 2i-1}=(2/\sqrt{2})(1-2y_{2i-1}), I_{\cdot 2i}=-Q_{\cdot 2i}=-(1/\sqrt{2})(1-2y_{2i}), \text{ for } i=1,2,\ldots,45.$$

By way of example, according to the DVB-S2 standard, the PL Header is composed of a Start of Frame (SOF) field (also referred to herein as the Unique Word or UW) 321 (e.g., comprising 26 symbols). The UW is uniform from frame to frame, and is inserted generally as a synchronization word for frame detection. The UW is used as a reference for detection of a burst or frame, and as a timing and frequency reference for decoding the header and payload portion of the frame. The UW field is followed by a Physical Layer Signaling (PLS) field 323 (e.g., comprising 64 symbols). The PLS field reflects seven signaling bits representing a mode indicator to identify the modulation and coding scheme applied to the PL data payload. The PLS field is encoded via a very low-rate block code (suitable for soft-decision correlation decoding, such as Fast Hadarmad Transform decoding), and a minimized number of signaling bits to reduce decoding complexity and global efficiency loss. The PLS field is always encoded in this fashion, because it is the first entity to be decoded by the receiver and provides the requisite information (e.g., modcod and type information, discussed below) necessary for enabling the receiver to decode the PL Data Payload, and thus the header must be decodable under worst-case link conditions. For example, in DVB-S2, the PLS field is bi-orthogonally coded via a non-systematic binary code of length 64 and dimension seven (64, 7), such as a first order Reed-Muller code under permutation. The PLS field is thereby encoded into 64 bits to form a bi-orthogonal signal set, which performs extremely well in noisy channels.

The seven signaling bits of the PLS field comprise two fields, a 5-bit modulation and coding or "modcod" field 331, and a 2-bit type field 333. The modcod field identifies the modulation and coding applied to the data payload (e.g., the modulation and coding applied to convert the baseband frames into the encoded and modulated XFEC frames—the XFEC frame modulation and FEC code rate). The type field identifies the FEC frame length (either 64,800 bits or 16,200 bits) and indicates the presence or absence of pilot symbol blocks. The modcod field comprises 5-bits identifying the modulation and code rate applied to the PL payload data. Each unique combination of the 5-bit modcod field reflects one of 28 possible modulation/code-rate schemes (plus 3 reserved modcod values and one value reflecting a dummy PL Frame). For example, the 32 values for the 5-bit modcod field of the DVB-S2 standard reflect the following modcod schemes:

| MODCOD Value | Mode (Modulation: Rate) |
| --- | --- |
| 1 | QPSK: 1/4 |
| 2 | QPSK: 1/3 |
| 3 | QPSK: 2/5 |
| 4 | QPSK: 1/2 |
| 5 | QPSK: 3/5 |
| 6 | QPSK: 2/3 |
| 7 | QPSK: 3/4 |
| 8 | QPSK: 4/5 |
| 9 | QPSK: 5/6 |
| 10 | QPSK: 8/9 |
| 11 | QPSK: 9/10 |
| 12 | 8PSK: 3/5 |
| 13 | 8PSK: 2/3 |
| 14 | 8PSK: 3/4 |
| 15 | 8PSK: 5/6 |
| 16 | 8PSK: 8/9 |
| 17 | 8PSK: 9/10 |
| 18 | 16APSK: 2/3 |
| 19 | 16APSK: 3/4 |
| 20 | 16APSK: 4/5 |
| 21 | 16APSK: 5/6 |
| 22 | 16APSK: 8/9 |
| 23 | 16APSK: 9/10 |
| 24 | 32APSK: 3/4 |
| 25 | 32APSK: 4/5 |
| 26 | 32APSK: 5/6 |
| 27 | 32APSK: 8/9 |
| 28 | 32APSK: 9/10 |
| 29 | Reserved |
| 30 | Reserved |
| 31 | Reserved |
| 0 | Dummy |

According to example embodiments, an additional set of 32 modulation/code-rate schemes may be signaled or identified using the same 7-bit signaling, without including any additional signaling bits in the PLS field or in the PL Header overall (which otherwise would consume additional bandwidth/overhead). In other words, an additional "virtual" flag bit (e.g., a virtual most significant bit (MSB), referred to here as a virtual bit, because an additional bit need not actually be transmitted to communicate the bit value) can be signaled or identified via the encoding of the PLS field (the 7-bit mode indicator). By way of example, to signal or communicate a virtual flag bit of a value of zero "0," the 7-bit PLS field would be π/2 BPSK modulated in the same manner as specified by the DVB-S2 standard. Alternatively, to signal or communicate a virtual flag bit of a value of one "1," the 7-bit PLS field would be modulated 90 degrees (90°) out of phase as compared to the normal π/2 BPSK modulation (e.g., modulated at a 90 degree lag or advance. All other aspects of the transmission would be the same. In other words, the one-bit virtual flag information is embedded in the phase of the Reed-Mueller code block. In that manner, under normal modulation, the 5-bit modcod field, for example, would reflect or identify the 32 modcod schemes of the DVB-S2 standard, while, under the out-of-phase modulation, the 5-bit modcod field would reflect or identify an additional 32 modulation/code-rate schemes. Alternatively, under the out-of-phase modulation, one or both of the 2 bits of the type field may additionally be used for the modcod field, increasing the number of additional modulation/code-rate schemes up to 64 or 128 (depending on whether just one or both of the type bits are used for additional modcod field bits). The SOF or UW pattern would still be transmitted without any phase shift. Moreover, while the foregoing example specifies a modulation phase shift of 90 degrees, it is contemplated that alternative methods of altering the modulation of the PLS filed may be employed to signal different states of such a "virtual" flag or indicator bit.

FIG. 4A illustrates a block diagram of an example receiver configured to operate in the systems of FIGS. 1A and 1B, in accordance with example embodiments of the present invention. With reference to FIG. 4A, for illustration purposes, the PLS field demodulators/decoders and data demodulator and decoder are broken out separately. As would be recognized, however, these components may be implemented according to various different hardware/software/firmware configurations. The receiver 420 comprises the antenna 429 and sync module 427. The sync module 427 establishes/maintains synchronization based on the SOF or UW field. Based on the synchronization, the PLS field information is fed to two different PLS field demodulator/decoder pairs 433*a*/435*a* and 433*b*/433*a*. For example, the decoders comprise two Reed-Muller decoders operating in parallel. Based on the synchronization established by the SOF, one decoder operates in-phase with the "normal" PLS field modulation, while the other decoder operates out-of-phase by 90 degrees from the "normal" PLS field modulation. Each decoder picks a codeword out of the 128 possible Reed-Muller codewords of 64 bits that best matches the received signal samples. The receiver then picks the better correlation of the two to determine the intended value of the "virtual" flag or indicator bit. For example, in the case of a zero value, the decoder adds a zero "0" as a new most significant bit of the 7-bit PLS field—in which case the 5-bit modcod field value remains as transmitted (e.g., the modcod field remains as the transmitted value from 0-31 identifying a one of the 32 modes of the DVB-S2 standard). Alternatively, in the case of a one value, the decoder adds a one "1" as a new most significant bit of the 7-bit PLS field—in which case the transmitted 5-bit modcod field value is effectively increased by 32 (e.g., the modcod field takes on a value of the transmitted value+32, taking on a value from 32-63 identifying a one of 32 additional modes or modulation/code-rate schemes). Additionally, under the out-of-phase scenario, if one of the type field bits (e.g., the short/long code indicator bit) is also used for the modcod field, then 6 bits are available for modcod identifiers—increasing the additional mdocod schemes to 64. Similarly, if both type field bits are used for the modcod field, then all 7 bits are available for modcod scheme identifiers (e.g., an additional 128 modcod schemes). The appropriate information is then communicated to the data demodulator 425 and decoder 423 for proper demodulation and decoding of the PL data payload, in accordance with the identified modcod scheme. The data de-encapsulation module 421 then de-encapsulates the data to generate the source bit stream.

Figure 4B:
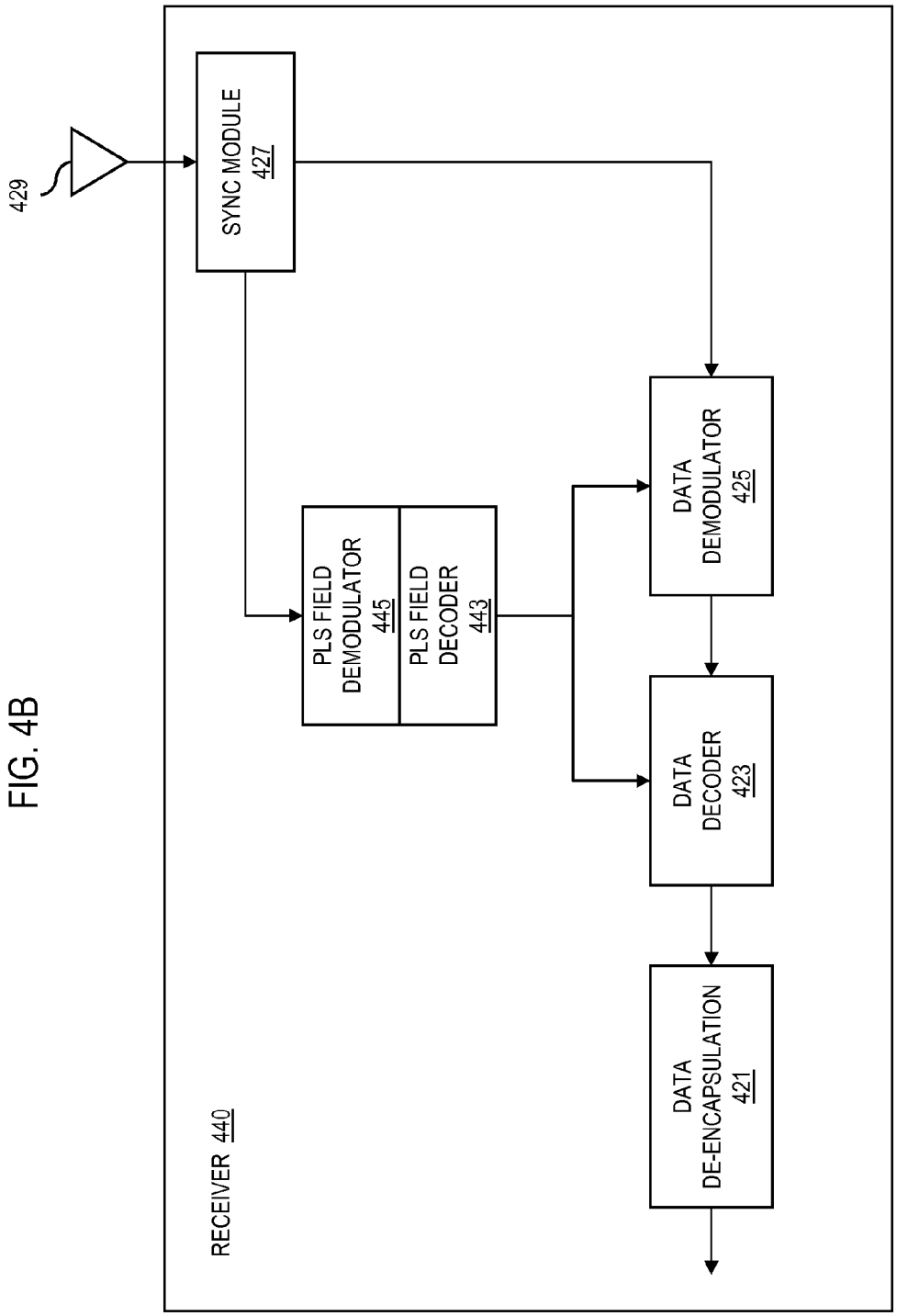

FIG. 4B illustrates a block diagram of a further example receiver configured to operate in the systems of FIGS. 1A and 1B, in accordance with example embodiments of the present invention. With reference to FIG. 4B (as with FIG. 4A), for illustration purposes, the PLS field demodulator/decoder and data demodulator and decoder are broken out separately. As would be recognized, however, these components may be implemented according to various different hardware/software/firmware configurations. In contrast to the receiver 420, the receiver 440 comprises only a single PLS field demodulator/decoder pair 443 and 445. The receiver 440, however, operates in the same manner as the receiver 420, except that the PLS field demodulator/decoder of the receiver 440 must operate at least at twice the speed of each the PLS field demodulator decoder pairs of the receiver 420. The PLS field demodulator/decoder 443/445 operates on each received PLS field in one phase at a time (e.g., first at the phase of the "normal" PLS field modulation, and then at a phase orthogonal to—out of phase by 90 degrees with respect to—the "normal" phase. The demodulator/decoder 443/445 then determines the best correlation of the 2 phases and adds the appropriate $8^{th}$ bit (MSB) to the 7-bit PLS field. The speed must be increased to maintain synchronization since the demodulator/decoder is not operating in both phases in parallel, and thus take a proportional additional amount of time to determine the intended value of "virtual" flag modcod signal bit.

Figure 5:
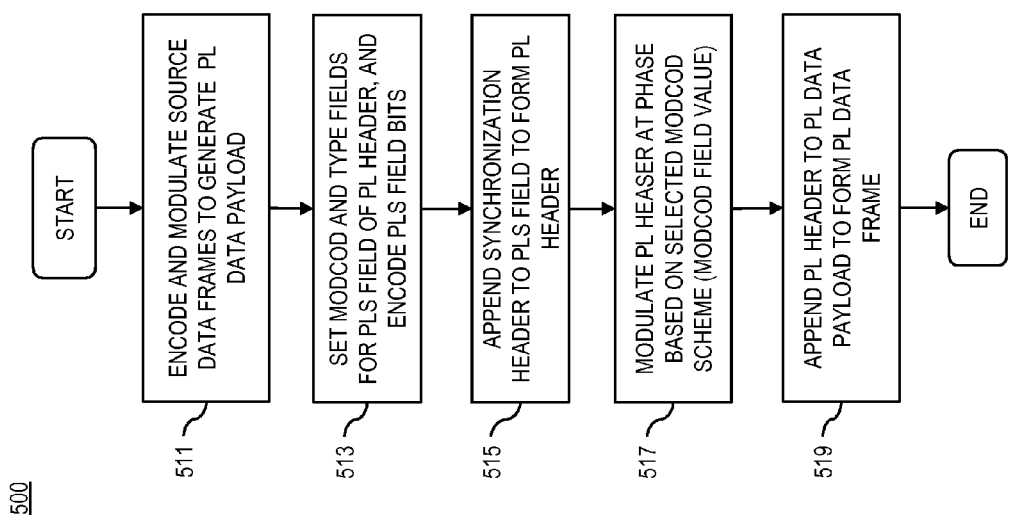
FIG. 5 illustrates a flow chart of an example process for encoding and modulating a source data sequence of information bits, in accordance with example embodiments of the present invention.

FIG. 5 illustrates a flow chart of an example process for encoding and modulating a source data sequence of information bits, in accordance with example embodiments of the present invention. With reference to FIG. 5, the process begins with the receipt of the source data frames. At step 511, the source data frames are encoded and modulated in accordance with a desired modulation and coding (modcod) scheme selected from a set of predetermined modcod schemes to generate the PL data payload. At step 513, the modcod and type fields are set according to the selected modcod scheme applied to the data (the modcod and type fields make up the PLS field of the PL Header), and the resulting PLS field bits are encoded. At step 517, a synchronization (sync) header (e.g., UW or SOF field) is appended to the PLS field to form the PL Header. At step 517, if the modcod field value corresponds to a modcod scheme of a first set of modcod schemes (e.g., in the case of DVB-S2, the modcod field is of a value from 0-31 signifying one of the DVB-S2 modcod schemes), then the PLS field is modulated at the "normal" phase. Alternatively, at step 517, if the modcod field value corresponds to a modcod scheme of a second set of modcod schemes (e.g., in the case of DVB-S2, the modcod field is of a value from 32-63 signifying one of an additional set of modcod schemes), then the PLS field is modulated at a phase shifted by 90 degrees from that of the "normal" PLS field modulation. At step 519, the PL Header is appended to the PL data payload to form the PL Frame.

Figure 6:
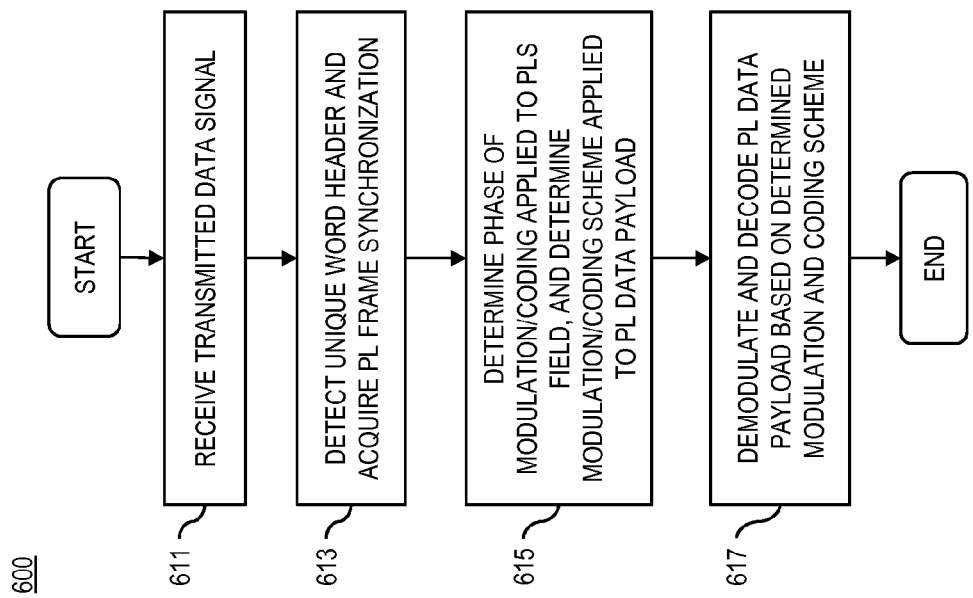
FIG. 6 illustrates a flow chart of an example process for demodulating and decoding a received data signal transmission, in accordance with example embodiments of the present invention.

FIG. 6 illustrates a flow chart of an example process for demodulating and decoding a received data signal transmission, in accordance with example embodiments of the present invention. For example, the process may be performed by one or more modules of a receiver (e.g., the receiver 420 of FIG. 4A or the receiver 440 of FIG. 4B). With reference to FIG. 6, the process the process starts at step 611, where the data signals transmitted over the satellite channel are received by the receiver 420/440. At step 613, the sync module 427 detects the unique word and acquires synchronization. At step 615, the PLS field demodulator/decoder determines the phase of the modulation applied to the PLS field at the transmitter. At step 617, the data demodulator 425 demodulates the data payload signal, and the data decoder 423 decodes the demodulated data payload signal based on the determined modulation and coding schemes.

FIG. 7 illustrates a block diagram of a chip set that can be utilized in implementing communications system protocols, according to example embodiments of the present invention. With reference to FIG. 7, chip set 700 includes, for instance, processor and memory components described with respect to FIG. 5 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communication mechanism such as a bus 701 for passing information among the components of the chip set. A processor 703 has connectivity to the bus 701 to execute instructions and process information stored in, for example, a memory 705. The processor 703 includes one or more processing cores with each core configured to perform independently. A multi-core processor enables multiprocessing within a single physical package. Examples of a multi-core processor include two, four, eight, or greater numbers of processing cores. Alternatively or in addition, the processor 503 includes one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, and/or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 may comprise various forms of computer-readable media, e.g., including both dynamic memory (e.g., RAM) and static memory (e.g., ROM) for storing executable instructions that, when executed by the processor 703 and/or the DSP 707 and/or the ASIC 709, perform the process of example embodiments as described herein. The memory 705 also stores the data associated with or generated by the execution of the process.

The term "computer-readable medium" or "computer-readable media," as used herein, refers to any medium that participates in providing instructions for execution by the processor 703, and/or one or more of the specialized components, such as the one or more digital signal processors (DSP) 707, and/or one or more application-specific integrated circuits (ASIC) 709. Such a medium may take many forms, including but not limited to non-volatile media, volatile media, and transmission media. Non-volatile media include, for example, read only memory (ROM), included within memory 705. Volatile media, for example, may include dynamic random access memory (RAM), included within memory 705. Transmission media may include conductive wiring, fiber optics, or other physical transmission media, including the media that comprise bus 701. Transmission media can also take the form of wireless data signals, such as radio frequency (RF) and infrared (IR) data communications. Common forms of computer-readable media include, for example, magnetic storage media (e.g., magnetic hard disks or any other magnetic storage medium), solid state or semiconductor storage media (e.g., RAM, PROM, EPROM, FLASH EPROM, a data storage device that uses integrated circuit assemblies as memory to store data persistently, or any other storage memory chip or module), optical storage media (e.g., CD ROM, CDRW, DVD, or any other optical storage medium), a or any other medium for storing data from which a computer or processor can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Moreover, as will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   generating a mode indicator field for identifying a modulation and coding mode applied to a data payload of a data frame of a communications network, wherein the modulation and coding mode is one of either a first set of modulation and coding modes or a second set of modulation and coding modes;
   encoding the mode indicator field; and
   modulating the encoded mode indicator field, wherein: (1) when the modulation and coding mode is one of the first set of modulation and coding modes, the modulation of the encoded mode indicator field is applied in a first mode; and (2) when the modulation and coding mode is one of the second set of modulation and coding modes, the modulation of the encoded mode indicator field is applied in a second mode.

2. The method of claim 1, wherein the first mode for the modulation of the encoded mode indicator field comprises modulation in a first phase, and the second mode for the modulation of the encoded mode indicator field comprises modulation in a second phase.

3. The method of claim 2, wherein the first phase for the modulation of the encoded mode indicator field is out of phase by approximately 90 degrees with respect to the second phase for the modulation of the encoded mode indicator field.

4. The method of claim 1, wherein:
   the mode indicator field comprises a plurality of bits reflecting respective binary values, and each binary value is associated with a respective modulation and coding mode of the first set of modulation and coding modes and with a respective modulation and coding mode of the second set of modulation and coding modes; and
   for a given mode indicator binary value, the modulation of the encoded mode indicator field distinguishes between the associated modulation and coding mode of the first set and the associated modulation and coding mode of the second set.

5. The method of claim 4, wherein, for the given mode indicator value, the modulation of the encoded mode indicator field in the first mode signifies the associated modulation and coding mode of the first set of modulation and coding modes, and the modulation of the encoded mode indicator field in the second mode signifies the associated modulation and coding mode of the second set of modulation and coding modes.

6. The method of claim 5, wherein the data frame comprises a physical layer (PL) data frame and the mode indicator field comprises a modcod field of a physical layer signaling (PLS) field of a header of the PL data frame, the modulation of the encoded mode indicator comprises a $\pi/2$ binary phase shift keying (BPSK) modulation, and the first mode for the modulation of the encoded mode indicator field comprises modulation in a first phase, and the second mode for the modulation of the encoded mode indicator field comprises modulation in a second phase, wherein the first phase is out of phase by approximately 90 degrees with respect to the second phase.

7. A method comprising:

receiving a signal stream transmitted over a communications channel, wherein the signal stream comprises one or more data frames, and each data frame comprises a frame header and a frame data payload;

detecting a start of frame (SOF) field within the signal stream;

locating a frame header of a one of the data frames based on the detected SOF field, and demodulating and decoding a frame signaling field of the frame header;

determining a mode of modulation applied to the frame signaling field, and determining a mode indicator field of the frame signaling field; and determining a modulation and coding mode applied to the frame data payload based on both the determined mode of modulation applied to the frame signaling field and the determined mode indicator field.

8. The method of claim 7, wherein the mode of modulation applied to the frame signaling field comprises one of a modulation in a first phase and a modulation in a second phase.

9. The method of claim 8, wherein the first phase for the modulation of the frame signaling field is out of phase by approximately 90 degrees with respect to the second phase for the modulation of the frame signaling field.

10. The method of claim 7, wherein:

the mode indicator field comprises a plurality of bits reflecting respective binary values, and each binary value is associated with a respective modulation and coding mode of a first set of modulation and coding modes and with a respective modulation and coding mode of a second set of modulation and coding modes; and for a given mode indicator value, the mode of modulation applied to the frame signaling field distinguishes between the associated modulation and coding mode of the first set and the associated modulation and coding mode of the second set.

11. The method of claim 10, wherein, for the given mode indicator value, a determination that the mode of modulation applied to the frame signaling field is of a first mode signifies the associated modulation and coding mode of the first set of modulation and coding modes, and a determination that the mode of modulation applied to the frame signaling field is of a second mode signifies the associated modulation and coding mode of the second set of modulation and coding modes.

12. The method of claim 11, wherein the data frames comprise physical layer (PL) data frames and the mode indicator field comprises a modcod field of a physical layer signaling (PLS) field of the frame header, the modulation applied to the frame signaling field comprises a π/2 binary phase shift keying (BPSK) modulation, and the first mode for the modulation applied to the frame signaling field comprises modulation in a first phase, and the second mode for the modulation applied to the frame signaling field comprises modulation in a second phase, wherein the first phase is out of phase by approximately 90 degrees with respect to the second phase.

13. An apparatus, comprising:

at least one processor; and at least one memory including computer program code for one or more programs, the at least one memory and the computer program code configured to, with the at least one processor, cause the apparatus to perform at least the following:

generating a mode indicator field for identifying a modulation and coding mode applied to a data payload of a data frame of a communications network, wherein the modulation and coding mode is one of either a first set of modulation and coding modes or a second set of modulation and coding modes;

encoding the mode indicator field; and modulating the encoded mode indicator field, wherein: (1) when the modulation and coding mode is one of the first set of modulation and coding modes, the modulation of the encoded mode indicator field is applied in a first mode; and (2) when the modulation and coding mode is one of the second set of modulation and coding modes, the modulation of the encoded mode indicator field is applied in a second mode.

14. The apparatus of claim 13, wherein the first mode for the modulation of the encoded mode indicator field comprises modulation in a first phase, and the second mode for the modulation of the encoded mode indicator field comprises modulation in a second phase.

15. The apparatus of claim 14, wherein the first phase for the modulation of the encoded mode indicator field is out of phase by approximately 90 degrees with respect to the second phase for the modulation of the encoded mode indicator field.

16. The apparatus of claim 13, wherein:

the mode indicator field comprises a plurality of bits reflecting respective binary values, and each binary value is associated with a respective modulation and coding mode of the first set of modulation and coding modes and with a respective modulation and coding mode of the second set of modulation and coding modes; and for a given mode indicator binary value, the modulation of the encoded mode indicator field distinguishes between the associated modulation and coding mode of the first set and the associated modulation and coding mode of the second set.

17. The apparatus of claim 16, wherein, for the given mode indicator value, the modulation of the encoded mode indicator field in the first mode signifies the associated modulation and coding mode of the first set of modulation and coding modes, and the modulation of the encoded mode indicator field in the second mode signifies the associated modulation and coding mode of the second set of modulation and coding modes.

18. The apparatus of claim 17, wherein the data frame comprises a physical layer (PL) data frame and the mode indicator field comprises a modcod field of a physical layer signaling (PLS) field of a header of the PL data frame, the modulation of the encoded mode indicator comprises a π/2 binary phase shift keying (BPSK) modulation, and the first mode for the modulation of the encoded mode indicator field comprises modulation in a first phase, and the second mode for the modulation of the encoded mode indicator field comprises modulation in a second phase, wherein the first phase is out of phase by approximately 90 degrees with respect to the second phase.

19. An apparatus, comprising:
at least one processor; and
at least one memory including computer program code for one or more programs,
the at least one memory and the computer program code configured to, with the at least one processor, cause the apparatus to perform at least the following:
receiving a signal stream transmitted over a communications channel, wherein the signal stream comprises one or more data frames, and each data frame comprises a frame header and a frame data payload;
detecting a start of frame (SOF) field within the signal stream;
locating a frame header of a one of the data frames based on the detected SOF field, and demodulating and decoding a frame signaling field of the frame header;
determining a mode of modulation applied to the frame signaling field, and determining a mode indicator field of the frame signaling field; and
determining a modulation and coding mode applied to the frame data payload based on both the determined mode of modulation applied to the frame signaling field and the determined mode indicator field.

20. The apparatus of claim 19, wherein the mode of modulation applied to the frame signaling field comprises one of a modulation in a first phase and a modulation in a second phase.

21. The apparatus of claim 20, wherein the first phase for the modulation of the frame signaling field is out of phase by approximately 90 degrees with respect to the second phase for the modulation of the frame signaling field.

22. The apparatus of claim 19, wherein:
the mode indicator field comprises a plurality of bits reflecting respective binary values, and each binary value is associated with a respective modulation and coding mode of a first set of modulation and coding modes and with a respective modulation and coding mode of a second set of modulation and coding modes; and
for a given mode indicator value, the mode of modulation applied to the frame signaling field distinguishes between the associated modulation and coding mode of the first set and the associated modulation and coding mode of the second set.

23. The apparatus of claim 22, wherein, for the given mode indicator value, a determination that the mode of modulation applied to the frame signaling field is of a first mode signifies the associated modulation and coding mode of the first set of modulation and coding modes, and a determination that the mode of modulation applied to the frame signaling field is of a second mode signifies the associated modulation and coding mode of the second set of modulation and coding modes.

24. The apparatus of claim 23, wherein the data frames comprise physical layer (PL) data frames and the mode indicator field comprises a modcod field of a physical layer signaling (PLS) field of the frame header, the modulation applied to the frame signaling field comprises a $\pi/2$ binary phase shift keying (BPSK) modulation, and the first mode for the modulation applied to the frame signaling field comprises modulation in a first phase, and the second mode for the modulation applied to the frame signaling field comprises modulation in a second phase, wherein the first phase is out of phase by approximately 90 degrees with respect to the second phase.

* * * * *